(12) United States Patent
Jane

(10) Patent No.: US 9,348,393 B1
(45) Date of Patent: May 24, 2016

(54) POWER MANAGEMENT SCHEME THAT ACCUMULATES ADDITIONAL OFF TIME FOR DEVICE WHEN OFF FOR AN EXTENDED PERIOD AND CREDITS ADDITIONAL OFF TIME TO POWER CONTROL FEEDBACK LOOP WHEN AWAKENED

(71) Applicant: Apple Inc., Cupertino, CA (US)

(72) Inventor: Jason P. Jane, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/471,245

(22) Filed: Aug. 28, 2014

Related U.S. Application Data

(60) Division of application No. 13/329,675, filed on Dec. 19, 2011, now Pat. No. 8,856,566, which is a continuation of application No. 13/326,614, filed on Dec. 15, 2011, now abandoned.

(51) Int. Cl.
*G06F 1/26* (2006.01)
*G06F 1/32* (2006.01)

(52) U.S. Cl.
CPC ............ *G06F 1/3203* (2013.01); *G06F 1/3234* (2013.01); *G06F 1/3296* (2013.01)

(58) Field of Classification Search
CPC ........................................................ G06F 1/32
USPC ................................................. 713/300, 320
See application file for complete search history.

(56) References Cited

U.S. PATENT DOCUMENTS

| | | |
|---|---|---|
| 5,924,650 A | 7/1999 | Richichi |
| 6,067,083 A | 5/2000 | Glen et al. |
| 6,076,171 A | 6/2000 | Kawata |
| 6,657,634 B1 | 12/2003 | Sinclair et al. |
| 6,687,844 B1 | 2/2004 | Zhang |
| 6,820,209 B1 | 11/2004 | Culbert et al. |
| 6,950,105 B2 | 9/2005 | Giemborek et al. |
| 7,017,059 B2 | 3/2006 | Law et al. |
| 7,256,795 B2 | 8/2007 | Chen |
| 7,451,332 B2 | 11/2008 | Culbert et al. |
| 7,490,254 B2 | 2/2009 | Clark |
| 7,500,123 B2 | 3/2009 | Luong et al. |
| 7,504,800 B2 | 3/2009 | Culbert et al. |

(Continued)

OTHER PUBLICATIONS

U.S. Appl. No. 13/329,675, filed Dec. 19, 2011, Jason P. Jane.

(Continued)

*Primary Examiner* — Mohammed Rehman
(74) *Attorney, Agent, or Firm* — Meyertons, Hood, Kivlin, Kowert & Goetzel, P.C.; Lawrence J. Merkel

(57) ABSTRACT

In one embodiment, a system includes a power management controller that controls a duty cycle of a processor to manage power. By frequently powering up and powering down the processor during a period of time, the power consumption of the processor may be controlled while providing the perception that the processor is continuously available. Before powering the processor up, the power management control may determine whether or not there is work for the processor to perform. If there is no work to perform, the power management control may delay powering the processor up until there is work to perform, saving additional power. This additional power savings may be tracked, and may serve as a "credit" for the processor when subsequently powered up again.

10 Claims, 7 Drawing Sheets

(56) References Cited

U.S. PATENT DOCUMENTS

| | | | |
|---|---|---|---|
| 7,529,948 B2 | 5/2009 | Conroy et al. | |
| 7,562,234 B2 | 7/2009 | Conroy et al. | |
| 7,664,970 B2 * | 2/2010 | Jahagirdar | G06F 1/3203 712/28 |
| 7,730,336 B2 | 6/2010 | Marinkovic et al. | |
| 7,788,516 B2 | 8/2010 | Conroy et al. | |
| 7,802,120 B2 | 9/2010 | Conroy et al. | |
| 7,849,332 B1 | 12/2010 | Alben et al. | |
| 7,861,013 B2 | 12/2010 | Hunkins et al. | |
| 7,903,116 B1 | 3/2011 | Klock et al. | |
| 8,010,822 B2 | 8/2011 | Marshall et al. | |
| 8,028,185 B2 | 9/2011 | Branover et al. | |
| 8,856,566 B1 | 10/2014 | Jane | |
| 8,924,752 B1 | 12/2014 | Law et al. | |
| 9,250,665 B2 | 2/2016 | Avkarogullari et al. | |
| 2002/0133789 A1 * | 9/2002 | Hsu | G06F 1/206 716/136 |
| 2004/0039954 A1 | 2/2004 | White et al. | |
| 2007/0067136 A1 | 3/2007 | Conroy et al. | |
| 2007/0238437 A1 | 10/2007 | Jaakkola | |
| 2008/0031279 A1 * | 2/2008 | Hatakeyama | H04L 12/40013 370/476 |
| 2008/0168285 A1 | 7/2008 | de Cesare | |
| 2009/0007123 A1 | 1/2009 | Sreedharan et al. | |
| 2009/0222654 A1 | 9/2009 | Hum et al. | |
| 2009/0284534 A1 | 11/2009 | Hendry et al. | |
| 2009/0299543 A1 | 12/2009 | Cox et al. | |
| 2009/0309885 A1 | 12/2009 | Samson et al. | |
| 2010/0103147 A1 | 4/2010 | Sumpter | |
| 2010/0115220 A1 * | 5/2010 | Lee | G11C 16/349 711/163 |
| 2010/0235654 A1 | 9/2010 | Malik | |
| 2011/0023040 A1 | 1/2011 | Hendry et al. | |
| 2011/0055596 A1 | 3/2011 | Wyatt | |
| 2011/0106935 A1 * | 5/2011 | Srinivasan | G06F 1/3209 709/224 |
| 2011/0145619 A1 | 6/2011 | Ho et al. | |
| 2011/0148890 A1 | 6/2011 | Kaburlasos et al. | |
| 2012/0054519 A1 | 3/2012 | Branover et al. | |
| 2012/0146708 A1 | 6/2012 | Naffziger et al. | |
| 2012/0166845 A1 | 6/2012 | Henry et al. | |
| 2013/0080816 A1 | 3/2013 | Johnson et al. | |
| 2013/0326250 A1 | 12/2013 | Sullivan et al. | |
| 2014/0344429 A1 * | 11/2014 | Baumann | G06F 1/3209 709/223 |

OTHER PUBLICATIONS

U.S. Appl. No. 13/595,305, filed Aug. 27, 2012, Gokhan Avkarogullari.
U.S. Appl. No. 61/656,719, filed Jun. 7, 2012, Gokhan Avkarogullari.
Anand Iyer, "Demystify Power Gating and Stop Leakage Cold", EE Times, Mar. 3, 2006, pp. 1-3.
Office Action from U.S. Appl. No. 13/090,459, mailed Sep. 3, 2013, pp. 1-17.
Ryan Smith, "AMD's Radeon HD 6970 & Radeon HD 6950: Paving the Future for AMD," AnandTech, Dec. 15, 2010, 44 pages.
Josh Venning, "ATI Mobility Radeon X1600 First Look," AnandTech, Dec. 5, 2005, 3 pages.
Anand Lal Shimpi & Derek Wilson, "ATI Radeon HD 3870 & 3850: A Return to Competition," AnandTech, Nov. 15, 2007, 16 pages.
Matthew Witheiler, "ATI Mobility Radeon 9000: Raising the bar again," AnandTech, Aug. 29, 2002, 12 pages.
AMD, FirePro Graphics: AMD PowerTune Technology, May 2011, PowerTune Technology Whitepaper, 9 pages.
W1zzard, NVIDIA GeForce GTX Kepler 2 GB Review, Mar. 2012, retrieved from <<http://www.techpowerup.com/reviews/NVIDIA/GeForce_GTX_680/30.html>> on Aug. 7, 2015, 5 pages.

* cited by examiner

POWER MANAGEMENT SCHEME THAT ACCUMULATES ADDITIONAL OFF TIME FOR DEVICE WHEN OFF FOR AN EXTENDED PERIOD AND CREDITS ADDITIONAL OFF TIME TO POWER CONTROL FEEDBACK LOOP WHEN AWAKENED

This application is a divisional of U.S. patent application Ser. No. 13/329,675, filed Dec. 19, 2011 and now U.S. Pat. No. 8,856,566, which is a continuation of U.S. patent application Ser. No. 13/326,614, filed Dec. 15, 2011 and now abandoned.

BACKGROUND

1. Field of the Invention

Embodiments described herein are related to the field of power management in integrated circuits and systems employing integrated circuits.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. Additionally, some integrated circuits have implemented power gating to reduce static power consumption (e.g. consumption due to leakage currents). With power gating, the power to ground path of the idle circuitry is interrupted, reducing the leakage current to near zero.

Power gating can be an effective power conservation mechanism. On the other hand, power gating reduces performance because the power gated circuitry cannot be used until power is restored and the circuitry is initialized for use. The tradeoff between performance (especially perceived performance from the user perspective) and power conservation is complex and difficult to manage.

SUMMARY

In one embodiment, a system includes a power management controller that controls a duty cycle of a processor to manage power. The duty cycle may be the amount of time that the processor is powered on as a percentage of the total time to complete a task. By frequently powering up and powering down the processor during a period of time, the power consumption of the processor may be controlled while providing the perception that the processor is continuously available. For example, the processor may be a graphics processing unit (GPU), and the period of time over which the duty cycle is managed may be a frame to be displayed on the display screen viewed by a user of the system.

Before powering the processor up, the power management control may determine whether or not there is work for the processor to perform. For example, in the case of a GPU, there is work to perform is there are graphics objects to be rendered into a frame. If there is no work to perform, the power management control may delay powering the processor up until there is work to perform, saving additional power. This additional power savings may be tracked, and may serve as a "credit" for the processor when subsequently powered up again. Using the credit, the processor may be permitted to consume more power than would otherwise be permitted, which may improve overall performance. For example, in an embodiment, the power management control may include a feedback loop to control power consumption by the processor over time. The power management control may account for the credit by exercising the feedback loop with a zero power consumption input. The feedback loop may be exercised for a number of iterations determined from the credit.

BRIEF DESCRIPTION OF THE DRAWINGS

The following detailed description makes reference to the accompanying drawings, which are now briefly described.

Figure 1:
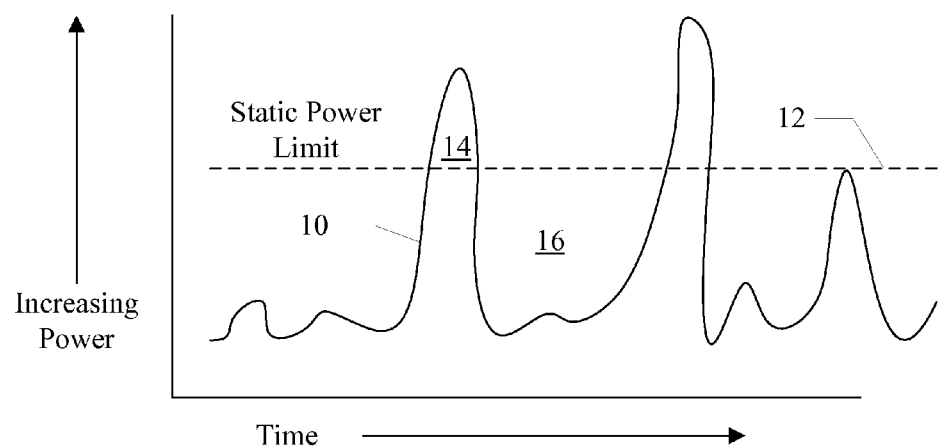
FIG. 1 is a diagram illustrating power consumption over time.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be "configured to" perform the task even when the unit/circuit/component is not currently powered on, because it includes the circuitry that implements the task. In general, the circuitry that forms the structure corresponding to the task may include hardware circuits and/or memory. The memory may store program instructions that are executable to implement the operation. The memory can include volatile memory such as static or dynamic random access memory. Additionally or in the alternative, the memory may include nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Overview

FIG. 1 is a diagram illustrating an example of dynamic power consumption over time in a processor (such as a GPU, for example). The dynamic power wave form 10 may increase at times of higher workload in the GPU, and may decrease at other times when the GPU is not busy. If a static power limit (dotted line 12) were implemented to control temperature and/or power consumption in the system, the performance of the processor would be capped such that its peak power stays under the static limit. That is, the GPU would be throttled, which may result in dropped frames or other visible discontinuities that are undesirable in the user experience. On the other hand, there may be times in which the power consumption is significantly below the limit (e.g. area 16 in FIG. 1).

In one embodiment, the power management unit described below may be configured to manage the duty cycle of a processor to control its power consumption. The power management unit may be configured to permit the processor to temporarily exceed a power budget for the processor, as long as the average power consumed remains within budget. The power management unit may implement a negative feedback loop based on the actual power consumed and the target power, and may use the error between the actual power and target power to control the duty cycle. The error in the case that the actual power is lower than the target power may be used for bursts of high power consumption when the workload of the processor increases.

Additionally, the power management unit may be configured to extend the power down time of the processor at the end of the power down portion of the duty cycle if there is no work for the processor to perform. That is, tasks (e.g. threads) may be scheduled for the processor in a task queue or other data structure in memory. If the task queue is empty, or the number of tasks in the queue is low enough that there is no urgent need for processor execution, the power off time may be extended.

The power management unit may be configured to monitor the amount of additional off time that the processor experiences. The additional off time conserves more power than the feedback loop was expecting, and may be used as a credit to permit additional power consumption by the processor. For example, the feedback loop may receive an indication of the additional off time and may lengthen the on time in subsequent duty cycles based on the credit. In an embodiment, the feedback loop may be iterated a number of times to cover the additional off time, and the actual processor power input to the feedback loop may be set to zero. For example, the feedback loop may be iterated at an approximately fixed time interval while the processor is powered up, and the feedback loop may be iterated until the number of iterations multiplied by fixed interval is approximately equal to the additional off time. Alternatively or in addition, the feedback loop may be re-initialized to an average processor power of zero if additional off time greater than a threshold has been accumulated.

Some of the embodiments below use a GPU as an example of the processor for which the power management unit is used. However, other embodiments may implement the power management unit with any processor (e.g. a central processing unit (CPU), other special purpose processors such as input/output processors (IOPs), digital signal processors (DSPs), embedded processors, microcontrollers, etc.). Still further, other embodiments may implement the power management to control fixed-function circuitry.

Figure 2:
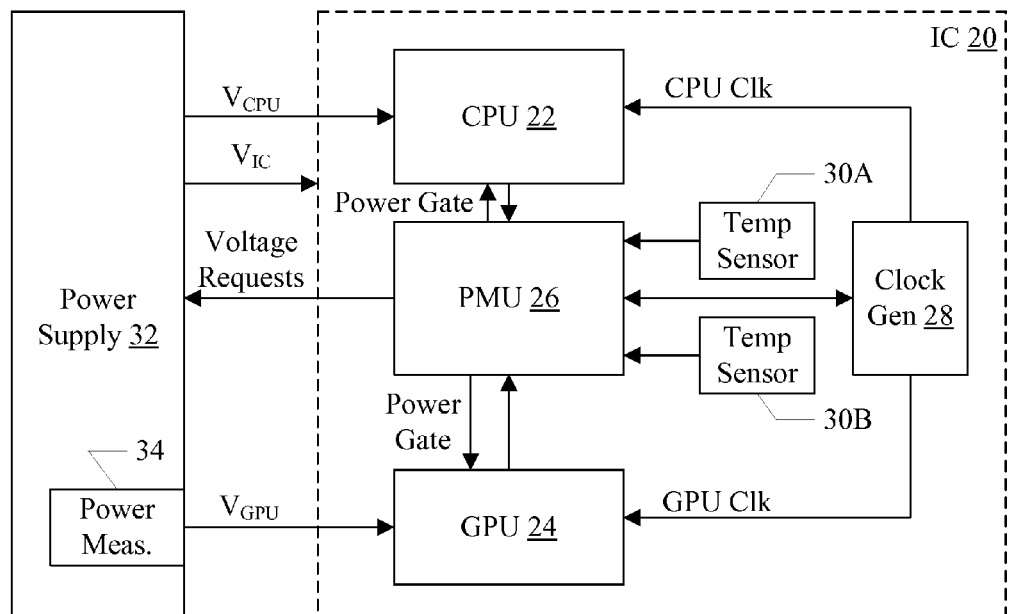
FIG. 2 is a block diagram of one embodiment of a system.

FIG. 2 is a block diagram of one embodiment of a system 18. In the illustrated embodiment, the system 18 includes an integrated circuit (IC) 20 which may be a system on a chip (SOC) in this embodiment. The IC 20 includes various processors such as a CPU 22 and a GPU 24. The IC 20 further includes a power management unit (PMU) 26, a clock generator 28, and one or more temperature sensors 30A-30B. The system 18 also includes a power supply 32, which may include a power measurement circuit 34 on a supply voltage provided to the GPU 24 ($V_{GPU}$ in FIG. 2).

The PMU 26 is configured to generate voltage requests to the power supply 32, which is configured to supply the requested voltages on one or more voltage inputs to the IC 20. More particularly, the PMU 26 may be configured to transmit a request for a desired voltage magnitude (including a magnitude of zero when the corresponding circuitry is to be powered down, in some embodiments). The number of independent voltage inputs supported by the IC 20 may vary in various embodiments. In the illustrated embodiment, the $V_{GPU}$ input is supported for the GPU 24 along with a $V_{CPU}$ input for the CPU 22 and a $V_{IC}$ input for the rest of the integrated circuit 20. Each voltage input may be provided to multiple input pins on the integrated circuit 20 to support enough current flow and power supply voltage stability to the supplied circuitry. Other embodiments may power the CPU with a separate supply but the GPU may receive the $V_{IC}$ supply. Still other embodiments may include other non-CPU voltage supplies besides the $V_{GPU}$ and $V_{IC}$ inputs.

The supply voltage to power-gated circuits such as the GPU 24 may be controlled via voltage requests from the PMU 26, but may also be controlled via power gate controls issued internally by the PMU 26 (e.g. the Power Gate control signals shown in FIG. 2). Gating the power internally may be performed more quickly than issuing voltage requests to the power supply 32 (and powering up may be performed more quickly as well). Accordingly, voltage requests to the power supply 32 may be used to vary the magnitude of the supply voltage (to adjust an operating point of the GPU 24), and the power gating during times that the GPU 24 is sleeping (or off) may be controlled internal to the IC 20.

As mentioned above, the PMU 26 may implement a negative feedback loop to control power consumption in the GPU 24. The PMU 26 may be configured to adjust the duty cycle of the GPU 24 responsive to the error between a target power and the actual power. Generally, the duty cycle may be viewed as a limit to the percentage of time that the GPU 24 is on (not power-gated) in a given period of time. The percentage of time that the GPU 24 is on in a given period of time may be the utilization. For example, the duty cycle and utilization may be measured over a frame time, where a frame time is the period of time elapsing for the display of one frame on a display device such as monitor, a touch screen display, etc. Viewed in another way, the utilization may be the ratio of the GPU's powered up time to an overall time for the display of multiple frames. In other embodiments that control other processors or fixed function circuitry, the utilization may similarly be defined as the on time of the controlled circuitry to the total time.

The target power may be determined in a variety of fashions. For example, the target power may be programmed in a register in the PMU 26. Alternatively, the target power may be based on the operating temperature in the system (e.g. as measured by the temperature sensors 30A-30B). In yet another example for a portable system that operates on a limited power supply such as a battery, the target power may be based on the remaining battery life. Combinations of the above factors and/or other factors may be used to determine the target power.

The actual power consumed may be measured (e.g. by the power measurement circuit 34, or by a similar circuit internal to the IC 20). Alternatively, the actual power may be estimated as a function of the activity in the GPU 24 and a profile of the power consumption of various parts of the GPU 24. The profile may be based on simulation of the GPU 24 design and/or based on measurements of the GPU 24 in operation.

Figure 3:
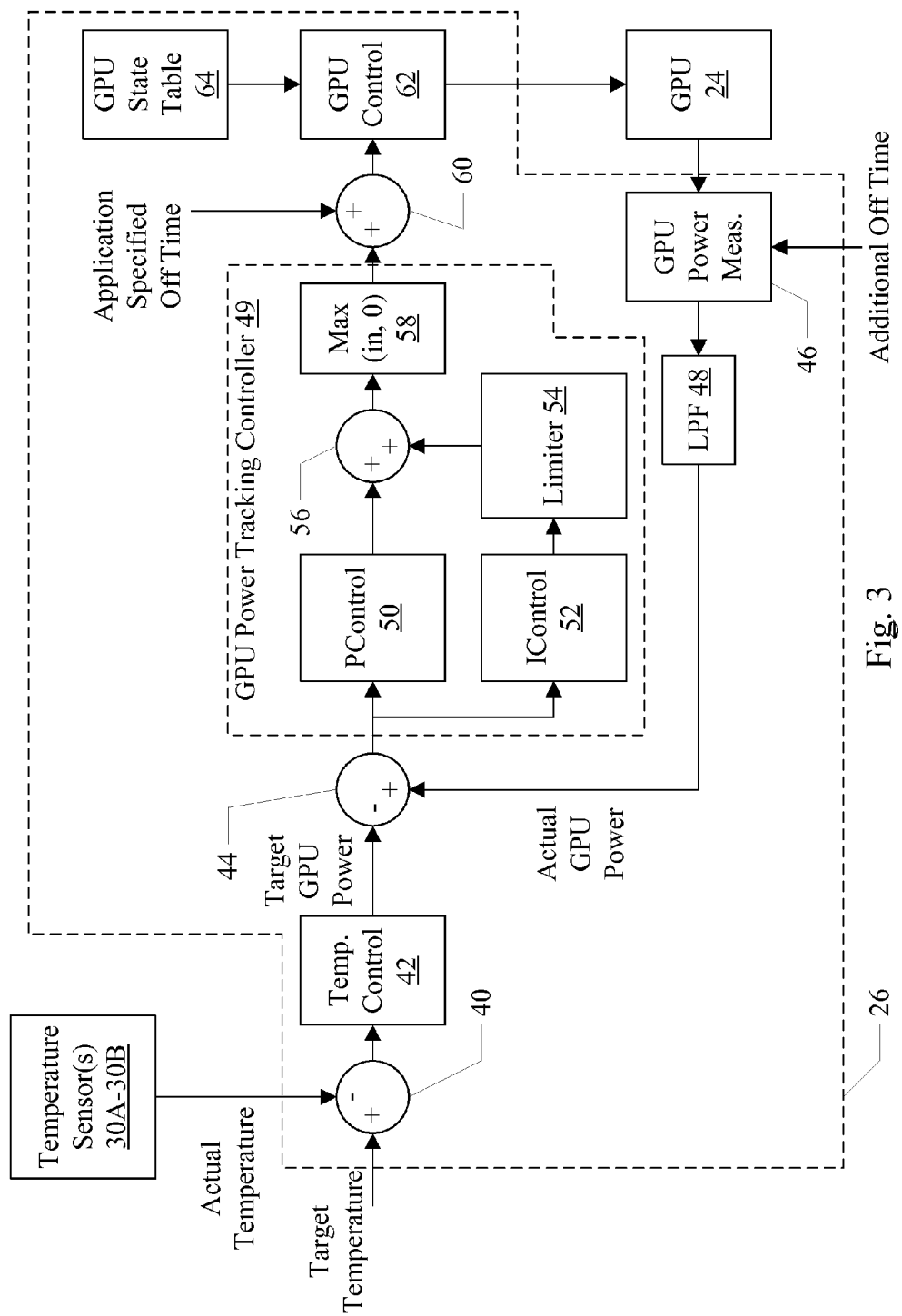
FIG. 3 is a block diagram of one embodiment of a graphics processing unit (GPU) and related power management blocks.

The PMU 26 and/or various components thereof such as shown in FIG. 3 in an embodiment may be implemented as any combination of hardware circuitry and/or instructions executed on one or more processors such as the CPU 22 and/or the GPU 24. The instructions may be stored on a computer accessible storage medium such as that shown in FIG. 10. Accordingly, a power management unit, power control unit, or controller may be any combination of hardware and/or processor execution of software, in various embodiments.

The power measurement circuit 34 may, e.g., be configured to measure the current flow on the $V_{GPU}$ supply. Based on the requested voltage, the power consumed in the GPU 24 may be determined either by the power measurement circuit 34 or the PMU 26. The power measurement circuit 34 may, e.g., be readable by software to determine the current/power measurement or may supply the current/power measurement on an input to the IC 20. In cases in which the additional off time is being credited within the feedback loop, the power measured by the power measurement circuit 34 may be overridden to set the input power consumption to the feedback loop to zero.

The clock generator 28 may supply clocks to the CPU (CPU Clk in FIG. 2), the GPU (GPU Clk in FIG. 2), the PMU 26, and any other circuitry in the IC 20. The clock generator 28 may include any clock generation circuitry (e.g. one or more phase lock loops (PLLs), digital delay lock loops (DLLs), clock dividers, etc.). The clock generator 28 may be programmed by the PMU 26 to set the desired clock frequencies for the CPU clock, the GPU clock, and other clocks.

Together, the supply voltage and clock frequency of a circuit in the IC 20 may be referred to as an operating point for the circuit. The operating point may directly affect the power consumed in the circuit, since the dynamic power is proportional to the frequency and to the square of the voltage. Accordingly, the reduced power consumption in the circuit when both the frequency and the voltage are reduced may be a cubic effect. However, operating point adjustments which change only the frequency or only the voltage may be made also (as long as the circuitry operates correctly at the selected frequency with the selected voltage).

The CPU 22 may be any type of processor and may implement an instruction set architecture. Particularly, the CPU 22 may implement any general purpose instruction set architecture. The CPU 22 may have any microarchitecture, including in-order or out-of-order, speculative or non-speculative, scalar or superscalar, pipelined, multithreaded, etc.

The GPU 24 may implement any graphics application programming interface (API) architecture. The graphics API architecture may define an abstract interface that is specially purposed to accelerate graphics operations. The GPU 24 may further support various languages for general purpose computation (e.g. OpenCL), etc.

The temperature sensors 30A-30B may be any type of temperature sensing circuitry. When more than one temperature sensor is implemented, the temperature sensors may be physically distributed over the surface of the IC 20. In a discrete implementation, the temperature sensors may be physically distributed over a circuit board to which the discrete components are attached. In some embodiments, a combination of integrated sensors within the IC and external discrete sensors may be used.

It is noted that, while the illustrated embodiment includes components integrated onto an IC 20, other embodiments may include two or more ICs and any level of integration or discrete components.

Power Consumption Control

Turning next to FIG. 3, a block diagram of one embodiment of the PMU 26 is shown in greater detail. The GPU 24 and the temperature sensors 30A-30B are shown as well. In the illustrated embodiment the PMU includes a summator 40 coupled to receive an actual temperature measurement from the temperature sensors 30A-30B and a target temperature (e.g. that may be programmed into the PMU 26, for example, or that may be set as a software parameter). As illustrated by the plus and minus signs on the inputs to the summator 40, the summator 40 is configured to take the difference between the target temperature and the actual temperature. The resulting temperature difference may be provided to a temperature control unit 42 which may output a target GPU power to a summator 44. The summator 44 may receive the actual GPU power from a GPU power measurement unit 46 (through a low pass filter (LPF) 48 in the illustrated embodiment). The output of the summator 44 may be the difference between the actual GPU power and the target GPU power (as illustrated by the plus and minus signs on the inputs), and may be an error in the power tracking. The difference may be input to a GPU power tracking controller 49. In the illustrated embodiment, the GPU power tracking controller 49 may include a proportional controller (PControl) 50, an integral controller (IControl) 52, a limiter 54, a summator 56, and a Max block 58. Thus, in the illustrated embodiment, the GPU power tracking controller 49 may be a proportional-integral (PI) controller. More particularly in the illustrated embodiment, the difference output from the summator 44 may be input to the PControl 50 and the IControl 52. The output of the IControl 52 may be passed through a limiter 54 to a summator 56 which also receives the output of the PControl 50, the output of which may passed through a Max block 58 to ensure that it is greater than zero. The output of the Max block 58 may be added to an application specified off time in the summator 60 to produce a desired duty cycle. A GPU control unit 62 may receive the duty cycle, and may change the GPU 24 to a different operating point in response. The available operating points may be stored in a GPU state table 64.

The summator 44 may be the beginning of the negative feedback loop that is configured to track the power error and is configured to attempt to minimize the error of the actual power exceeding the target power. In this embodiment, the actual power may be less than the target power by any amount. Other embodiments may also limit the difference between the actual power and the target power below a lower threshold, for example, to improve performance. In the illustrated embodiment, a proportional-integral (PI) control may be implemented in the GPU power tracking controller 49. The proportional component of the control may be configured to react to the current error, while the integral component may be configured to react to the error integrated over time. More particularly, the integral component may be configured to eliminate the steady state error and control the rate at which the target GPU power is reached. The amount of integral control may be limited through the limiter 54, in some embodiments, as desired. Generally, the gains of both the proportional controller 50 and integral controller 52 may be programmable, as may the limiter 54.

The summator 56 may be configured to sum the outputs of the proportional controller 50 and the limiter 54, generating a value that may be inversely proportional to the duty cycle to be implemented by the GPU control unit 62. The block 58 may ensure that the output is positive, effectively ignoring the case where the actual power is less than the target power. Together, the components 44, 50, 52, 54, 56, and 58 may be referred to as the duty cycle controller herein. In other embodiments, the duty cycle controller may output the duty cycle itself.

In the illustrated embodiment, the operation of the feedback loop may be exposed to applications. Some applications may attempt to control GPU power consumption at a higher level of abstraction, and the applications' efforts may interfere with the operation of the PMU 26. By providing exposure to the application, the PMU 26 may permit the application to have an effect on loop operation and thus the application developer may no longer include application-level efforts to control GPU power. In other embodiments, application input may not be provided and the summator 60 may be eliminated. In the illustrated embodiment, the application may specify an off time for the GPU during a given frame time.

While PI control is shown in FIG. 3 for the GPU power tracking controller 49, other embodiments may implement other control units such as including derivative control (PID), or any other subcombination of proportional, integral, and derivative control. Still further, any other control design may be used (e.g. table based).

The GPU control unit 62 may be configured to adjust the operating point of the GPU 24 based on the utilization of the GPU 24. The utilization of the GPU 24 may be viewed as the percentage of a frame time that the GPU 24 is powered up and operating. The duty cycle indicated by the duty cycle controller (and converted to duty cycle by the GPU control unit 62, as discussed in more detail below) may serve as a limit to the utilization in order to meet thermal requirements, battery life requirements, etc. However, the actual utilization may be smaller (e.g. if the GPU 24 is performing relatively simple operations each frame time, the actual utilization may be lower than the duty cycle). If the utilization is lower than the duty cycle, it may still be desirable to reduce the operating point of the GPU 24 to reduce power consumption, increasing the utilization. The duty cycle may vary between 100% (no throttling by the duty cycle controller) and a lower limit within the range of duty cycles. For example, the lower limit may be about 70% of the frame time. If the utilization is lower than a threshold amount, the GPU control unit 62 may reduce the operating point to a lower power state (e.g. lower voltage and/or frequency) to lengthen the utilization but reduce the power consumption. That is, if the utilization is low, then it appears to the control unit 62 that the GPU 24 is finishing it's tasks for the frame rapidly and is sleeping for long periods of time. The GPU 24 may therefore operate at a reduced operating point and may run for longer periods. Similarly, if the utilization is high, then more performance may be needed from the GPU 24. Accordingly, the GPU control unit 62 may increase the operating point up to the limit set by the duty cycle controller.

In FIG. 3, the GPU control unit 62 is shown coupled to the GPU 24. The GPU control unit 62 may actually be coupled to the clock generator 28 (to change GPU clock frequency) and the power supply 32 (to request a different supply voltage magnitude). The GPU control unit 62 may be configured to record the current operating point of the GPU 24, and when the GPU control unit 62 determines that the operating point is to be changed, the GPU control unit 62 may be configured to read the new operating point from the GPU state table 64. That is, the GPU state table 64 may store the permissible operating points for the GPU 24, and the GPU control unit 62 may be configured to select the desired operating point from the operating points listed in the GPU state table 64.

The GPU power measurement unit 46 may be configured to measure the GPU power consumption. In some embodiments, the GPU power measurement unit 46 may receive data from the power measurement circuit 34 to measure the GPU power. In other embodiments, the GPU power measurement unit 46 may estimate the power consumption based on the activity in the GPU 24. For example, the GPU power measurement unit 46 may be configured to read a variety of performance counters in the GPU 24. The values in the performance counters, along with factors derived from simulations of the GPU 24 or direct measurements on an implementation the GPU 24, may be used to estimate the power consumption. The factors may be programmable in the GPU power measurement unit 46, fixed in hardware, or any combination of programmable and fixed factors.

The GPU power measurement unit 46 in FIG. 3 is coupled to receive the additional off time measured for the GPU 24 if it remains off when the GPU 24 would otherwise power back on based on the duty cycle. The GPU power measurement unit 46 may override the actual power measurement for a number of iterations to account for the additional off time, using zero as the actual GPU power for those iterations. The iterations may be run back-to-back when the GPU 24 is powered back on, rather than at the fixed intervals, to account for the additional off time. In one embodiment, the GPU power measurement unit 46 may comprise firmware that executes on the GPU itself, and the additional iterations may be executed in response to the GPU powering back on. In other embodiments, the GPU power measurement unit 46 may execute on the CPU 22 and/or may be implemented in circuitry within the GPU 24. In other embodiments, the override of the actual GPU power may be implemented in the low pass filter 48 or at the summator 44.

It is noted that one reason for iterating the feedback loop to account for the additional of time may be found in the PI controller. Integral control retains some amount of residual from previous measurements, and thus supplying the actual power of zero and iterating the feedback loop may reduce the residual to reflect the lack of power consumption in the additional off time.

In an embodiment, power consumption measurements may be made on the order of once a millisecond, while the duty cycle controller may operate more slowly (e.g. on the order of once per second). Accordingly, the low pass filter 48 may filter the measurements to smooth out the measurements and reduce momentary spikes that might occur. The low pass filter 48 may effectively "bank" power that is not consumed (e.g. in the area 16 of FIG. 1) and may permit the power consumption to possibly exceed the power budget briefly after a period of low power consumption. Other embodiments may not require the filtering and the low pass filter 48 may be eliminated.

In the illustrated embodiment, the negative feedback loop to control power may be included within a thermal loop to control temperature. For example, in FIG. 3, the temperature measured by the temperature sensors 30A-30B may be compared to the target temperature, and the temperature control unit 42 may generate a target GPU power value responsive to the difference in the temperatures. As the actual temperature rises toward the target temperature (or perhaps surpasses the target temperature), the temperature control unit 42 may be configured to reduce the target GPU power value. By reducing power consumption in the GPU 24, the temperature may be reduced and thus may approach the target temperature or remain below the target temperature.

The temperature control unit 42 may implement any control mechanism. For example the temperature control unit 42 may include a table of temperatures and corresponding target power values. Alternatively, the temperature control unit 42 may implement PID control or any subset thereof, or any other control functionality. In other embodiments, other factors than temperature may be used to determine target power consumption. For example, desired battery life for a mobile device may be translated to target power consumption.

In one embodiment, the PMU 26 may be implemented in hardware, or a combination of hardware and software. Specifically in an embodiment, the temperature control unit 42 may be implemented in software as part of an operating system executing in the system 18. The duty cycle controller (blocks 44, 50, 52, 54, 56, 58, and 60) may be implemented in a driver that is executed by the CPU 22 and that controls the GPU. Alternatively, the duty cycle controller may be implemented in a control thread that executes on the GPU 24 itself (referred to as GPU firmware). In other embodiments, the duty cycle controller may be implemented in a combination of GPU driver and firmware. The GPU control unit 62 may be implemented in the GPU firmware. Similarly, the GPU power measurement unit 46 may be implemented in firmware. It is noted that a summator may be any combination of hardware and/or software that produces a sum of the inputs to the summator (where an input having a minus sign may be negated into the sum and the sum may be a signed addition).

Figure 4:
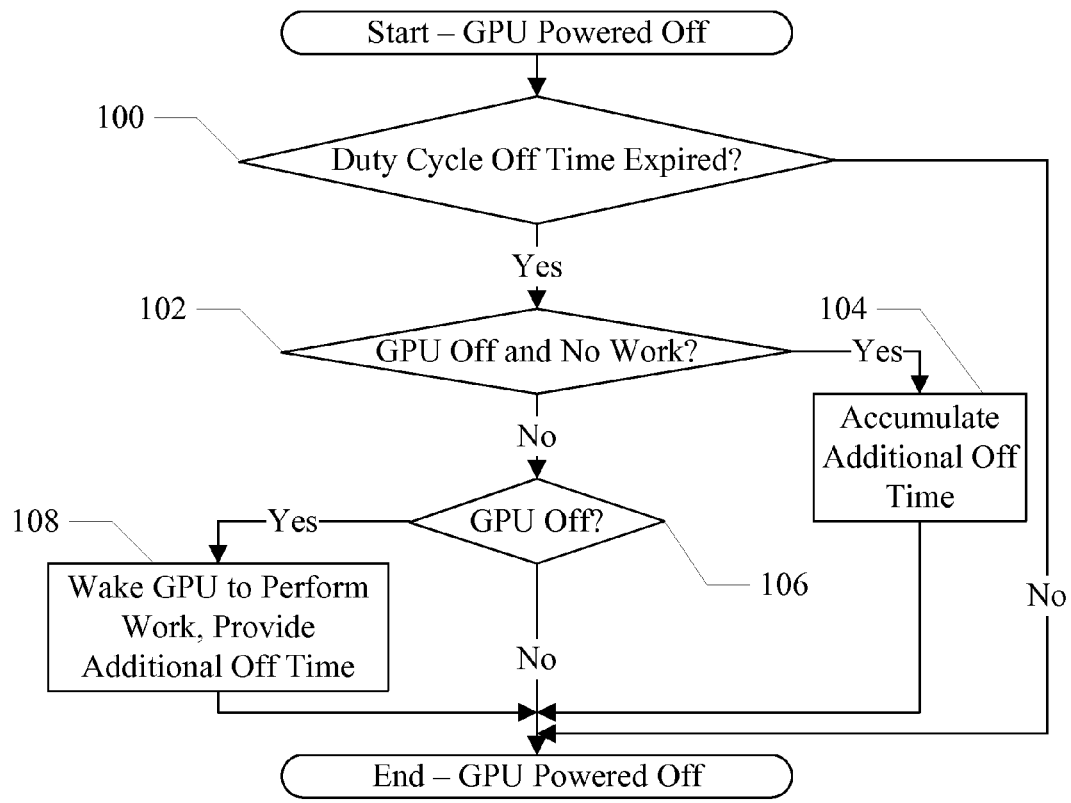
FIG. 4 is a flowchart illustrating operation of one embodiment of a power management unit 26 during a time that the GPU is powered off.

FIG. 4 is a flowchart illustrating one embodiment of the PMU 26 during the time period that the GPU 24 is powered off. While the blocks are shown in a particular order for ease of understanding, other orders may be used. Embodiments that implement the features of FIG. 4 in hardware may implement one or more blocks in parallel, in combinatorial logic circuitry, and/or may pipeline the operation over multiple clock cycles. Embodiments that implement features of FIG. 4 in software may include instructions which, when executed, cause the system to perform the operations illustrated. In one embodiment, the operation of the flowchart in FIG. 4 may be implemented in driver software that executes on the CPU 22.

If the duty cycle off time has not yet expired (decision block 100, "no" leg), the PMU 26 is idle with regard to the GPU 24. However, if the duty cycle off time has expired (decision block 100, "yes" leg), and the GPU 24 is still powered off and there is no work for the GPU 24 to do (e.g. the GPU's task queue is empty—decision block 102, "yes" leg), the PMU 26 may accumulate the additional off time (block 104). The additional off time may be the amount of time that exceeds the off time specified by the feedback loop for the current duty cycle. In some embodiments, the amount of additional off time may saturate at a certain amount (i.e. no additional credit for the GPU power consumption is accrued when the amount is reached). The saturation amount may be based on the amount of effort needed to process the accumulated off time (e.g. in terms of number of iterations of the feedback loop). The amount of effort to process the accumulated off time beyond the saturation amount may impact performance to an unacceptable extent by delaying the power on sequence, for example. The saturation amount may further be based on the amount at which additional accumulation is not effective (e.g. because the feedback loop reaches 100% duty cycle at the highest operating point, or close to such a level), etc. If the GPU is off but there is work to be performed (decision block 102, "no" leg and decision block 106, "yes" leg), the PMU 26 may wake the GPU 24 to perform the work, and may provide the additional off time to be credited within the feedback loop (block 108). Waking the GPU 24 may include powering up the GPU 24, initializing the GPU 24 to a known state, and loading the thread(s) to be executed.

Figure 5:
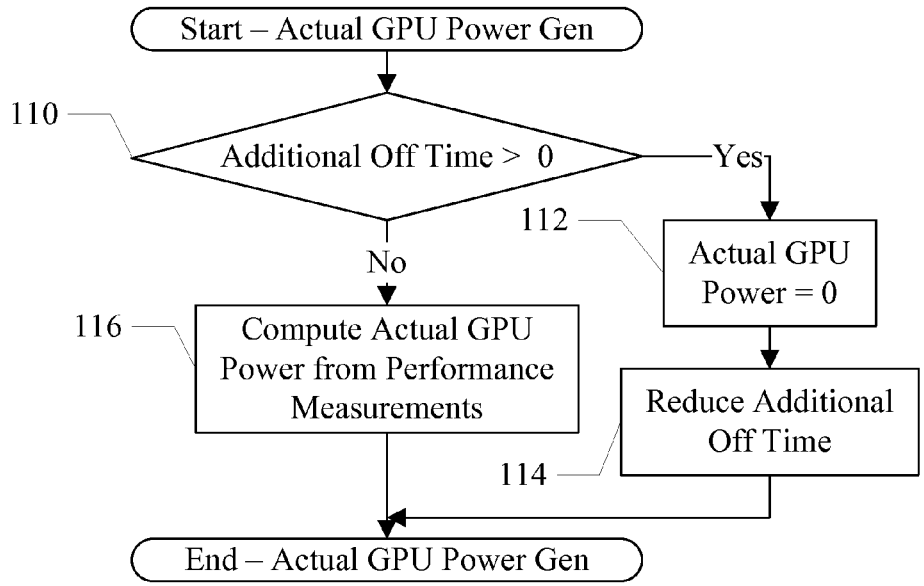
FIG. 5 is a flowchart illustrating operation of one embodiment of actual GPU power for an embodiment.

FIG. 5 is a flowchart illustrating operation of one embodiment of the actual GPU power generation in the feedback loop. While the blocks are shown in a particular order for ease of understanding, other orders may be used. Embodiments that implement the features of FIG. 5 in hardware may implement one or more blocks in parallel, in combinatorial logic circuitry, and/or may pipeline the operation over multiple clock cycles. Embodiments that implement features of FIG. 5 in software may include instructions which, when executed, cause the system to perform the operations illustrated. In one embodiment, the operation of the flowchart in FIG. 5 may be implemented in driver software that executes on the CPU 22, GPU firmware that executes on the GPU, or a combination thereof. For example, the implementation may be part of the GPU power measurement unit 46 and thus may be GPU firmware in such an implementation. Alternatively, the implementation may be between the GPU power measurement unit 46 and the input to the summator 44. The description below will describe the implementation is being in the GPU power measurement unit 46 for simplicity, but the implementation may be relocated as desired in other embodiments.

If the additional off time provided by the PMU 26 is greater than zero (decision block 110, "yes" leg), the GPU power measurement unit 46 may set the actual GPU power to zero (block 112). Additionally, the GPU power measurement unit 46 may reduce the additional off time (block 114). For example, the additional off time may be measured in iterations of the feedback loop and the GPU power measurement unit 46 may decrement the iteration count by one. In another example, the additional off time may be measured in real time and the additional off time may be reduced by the amount of time between iterations of the feedback loop in the normal mode. The feedback loop may actually iterate more quickly while crediting for the additional off time. If the additional off time is not greater than zero (decision block 110, "no" leg), the GPU power measurement unit 46 may compute the actual GPU power from performance measurements (or direct power measurement, as described previously) (block 116).

Figure 6:
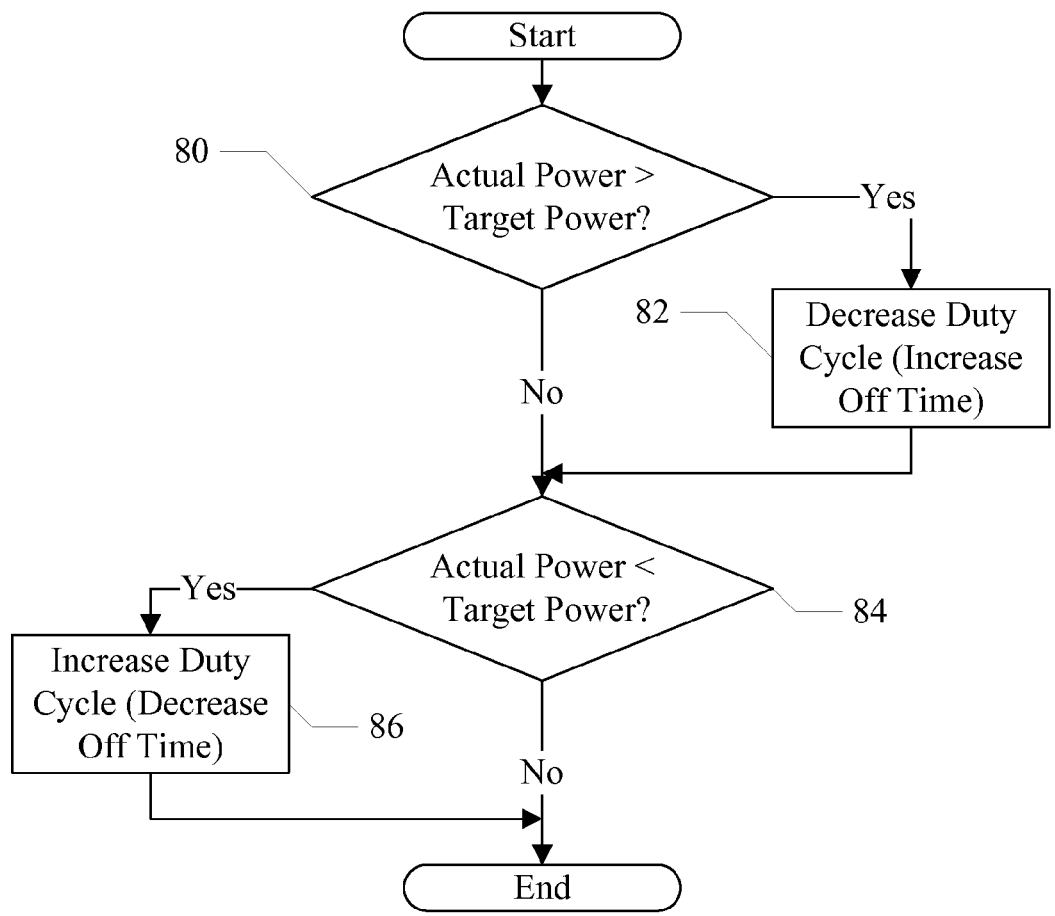
FIG. 6 is a flowchart illustrating operation of one embodiment of a duty cycle controller shown in FIG. 3.

Turning next to FIG. 6, a flowchart is shown illustrating operation of one embodiment of the duty cycle controller (e.g. the combination of the summators 44 and 56, the PControl 50, the IControl 52, the limiter 54, and the block 58 in FIG. 3). While the blocks are shown in a particular order for ease of understanding, any order may be used.

If the actual power exceeds the target power (decision block 80, "yes" leg), the duty cycle controller may decrease the duty cycle (i.e. increase the off time) (block 82). The determination of the actual power exceeding the target power may be more than a simple mathematical comparison on the current actual power and the target power. For example, the low pass filter 48 may have captured the lack of power consumption during a time such as the area 16 in FIG. 1, and the actual power may be able to exceed the target power for a period of time to use the "unused" power from the previous low power consumption.

In some embodiments, if the target power is greater than the actual power, the duty cycle controller may not limit the utilization by controlling the duty cycle (e.g. the duty cycle may be increased up to 100%, or the off time may be zero) (decision block 84, "yes" leg and block 86).

Figure 7:
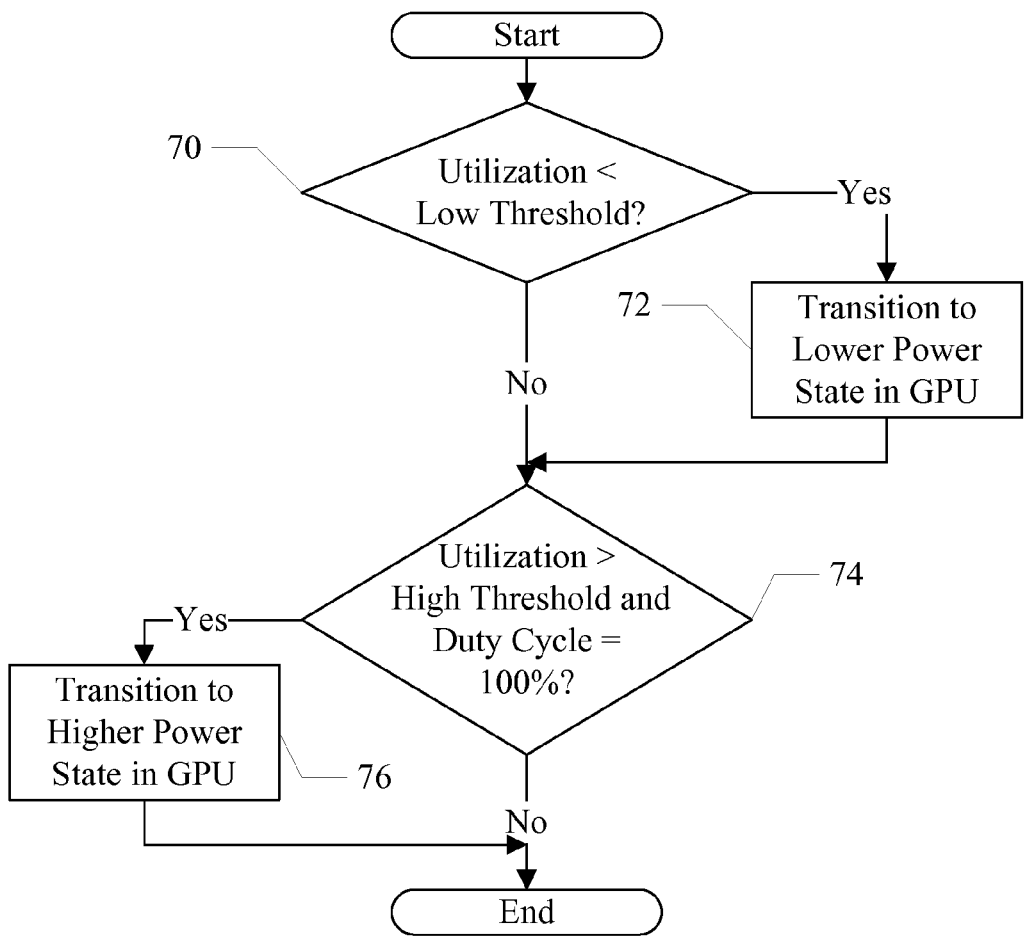
FIG. 7 is a flowchart illustrating operation of one embodiment of a GPU control unit shown in FIG. 3.

Turning next to FIG. 7, a flowchart is shown illustrating operation of one embodiment of the GPU control unit 62. While the blocks are shown in a particular order for ease of understanding, any order may be used. The operation of FIG. 7 may be repeated continuously during use to update the power state of the GPU 24 as it's workload changes over time.

If the utilization of the GPU 24 is less than a low threshold (e.g. 70% in one example) (decision block 70, "yes" leg), the GPU control unit 62 may transition the GPU 24 to a lower power state (block 72). If the utilization of the GPU 24 is greater than a high threshold (e.g. 90% in one example) and the duty cycle is 100% (e.g. no throttling due to thermal limits) (decision block 74, "yes" leg), the GPU control unit 62 may transition the GPU 24 to a higher power state (block 76).

Figure 8:
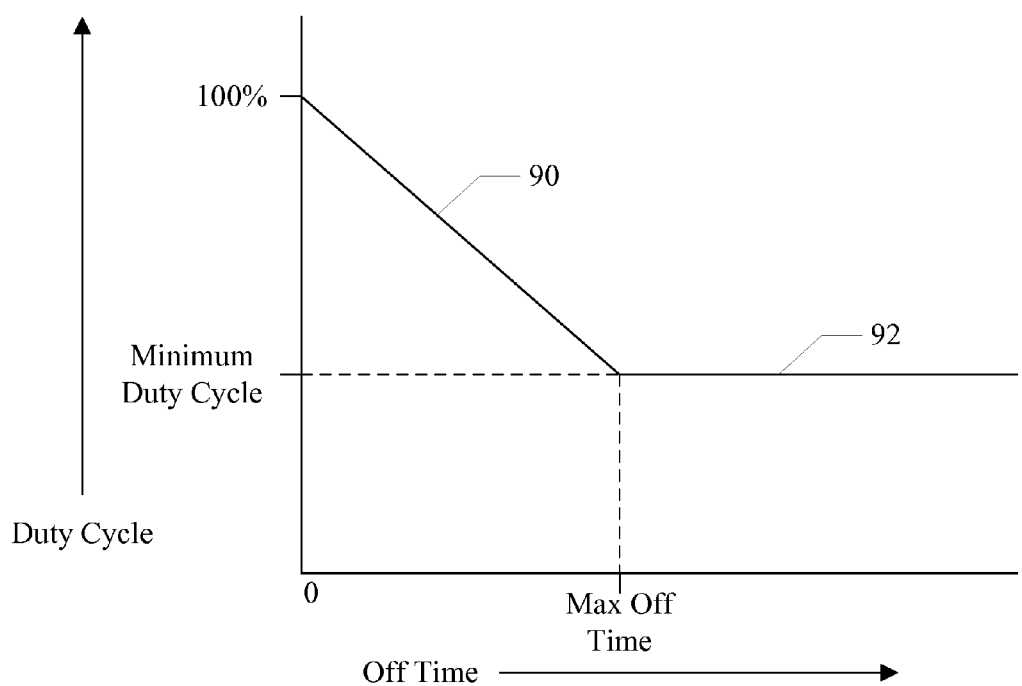
FIG. 8 is a diagram illustrating a transfer function between an output of a duty cycle controller and the duty cycle limit for the GPU control unit.

In one embodiment, the output of the duty cycle controller (e.g. the output of the summator 60 in FIG. 3) may be a value representing the off time for the GPU 24. The GPU control unit 62 may implement a transfer function converting the off time (or amount of throttling) to a duty cycle measurement. FIG. 8 is an example of such a transfer function. If the output of the duty cycle controller is zero (e.g. the actual power is less than or equal to the target power), the duty cycle may be 100%. As the duty cycle controller output (off time) increases to a maximum amount, the duty cycle may decrease to a minimum duty cycle (line 90). Once the minimum duty cycle/ maximum off time is reached, the duty cycle remains at the minimum duty cycle even if the off time output would otherwise be greater (line 92). The minimum duty cycle and/or maximum off time may be programmable or fixed in the PMU 26, in various embodiments.

Figure 9:
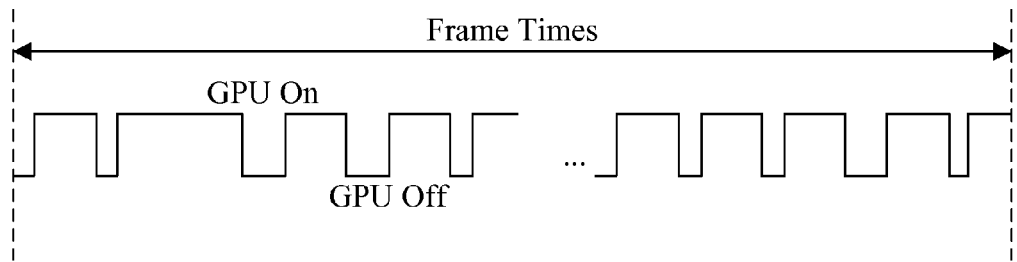
FIG. 9 is a block diagram illustrating one embodiment of duty cycling an on/off state of a GPU.

FIG. 9 is a timing diagram illustrating frame times and GPU on and off times. As can be seen in FIG. 9, the on and off times need not be regular, but rather may vary over the frame times.

Figure 10:
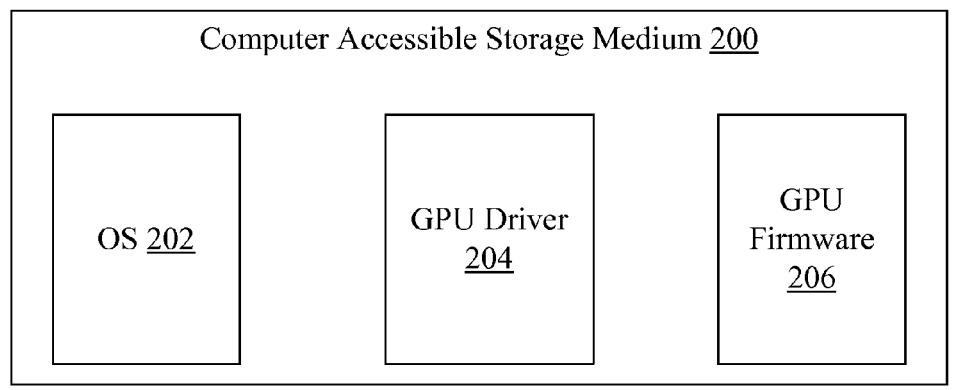
FIG. 10 is a block diagram of one embodiment of a computer accessible storage medium.

Turning now to FIG. 10, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

The computer accessible storage medium 200 in FIG. 10 may store an operating system (OS) 202, a GPU driver 204, and a GPU firmware 206. As mentioned above, the temperature control unit 42 may be implemented in the operating system 202, the power control to generate a duty cycle may be implemented in the GPU driver 204, and the GPU control unit 62 may be implemented in the GPU firmware 206. Each of the operating system 202, the GPU driver 204, and the GPU firmware 206 may include instructions which, when executed in the system 18, may implement the operation described above. In an embodiment, the OS 202 and the GPU driver 204 may be executed on the CPU 22, and the GPU firmware 206 may be executed on the GPU 24. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
    activating a processor from a low power mode to a higher power mode;
    responsive to activating the processor, providing a feedback loop with data indicating a first amount of time that the processor was in the low power mode and that exceeded a second amount of time that the feedback loop indicated for the low power mode at a time that the processor entered the low power mode, wherein the feedback loop controls processor power consumption based on estimated processor power consumption over time;
    responsive to activating the processor, determining a number of iterations of the feedback loop that correspond to the first amount of time;
    responsive to activating the processor, exercising the feedback loop for the number of iterations to account for the first amount of time; and
    during exercising the feedback loop for the number of iterations, setting the estimated processor power consumption provided to the feedback loop to zero; and
    determining a duty cycle for a power on/power off time of the processor by the feedback loop, wherein a power on portion of the duty cycle is lengthened responsive to the exercising.

2. The method as recited in claim 1 wherein the number of iterations is sufficient to reduce an average processor power as determined by the feedback loop to zero.

3. The method as recited in claim 1 further comprising:
    causing the processor to enter the low power mode for a designated period of time;
    at an expiration of the designated period, determining that the processor is to remain in the low power mode;
    subsequent to determining that the processor is to remain in the low power mode, determining that the activating is to occur.

4. The method as recited in claim 3 further comprising:
    while the processor remains in the low power mode, accumulating an indication of the first amount of time.

5. The method as recited in claim 3 wherein determining that the processor is to remain in the low power mode comprises detecting that there are no tasks scheduled for the processor to perform at the expiration of the designated period.

6. A system comprising:
    a graphics processing unit (GPU); and
    a controller coupled to the graphics processing unit, wherein the controller is configured to activate the GPU from a low power mode to a higher power mode, wherein the controller includes a feedback loop that controls power consumption of the GPU over time based on estimated GPU power consumption, and wherein the controller is configured to exercise the feedback loop a number of iterations to account for a first amount of time responsive to activating the GPU to the higher power mode, wherein the controller is configured to provide a zero input estimated GPU power to the feedback loop for the number of iterations, wherein the exercise of the feedback loop is responsive to activating the GPU, and wherein the first amount of time is a time in which the processor was in the low power mode and that exceeded a second amount of time that the feedback loop indicated for the low power mode when the GPU entered the low power mode, wherein the feedback loop is configured to determine a duty cycle for a power on/power off time of the GPU, and wherein a power on portion of the duty cycle is lengthened responsive to exercising the feedback loop for the number of iterations.

7. The system as recited in claim 6 wherein the number of iterations is sufficient to reduce an average power of the GPU as determined by the feedback loop to zero.

8. The system as recited in claim 6 wherein the controller is further configured to cause the GPU to enter the low power mode for a designated period of time, and wherein the controller is configured to determine that the GPU is to remain in the low power mode at an expiration of the designated period.

9. The system as recited in claim 8 wherein the controller is configured to accumulate an indication of the first amount of time while the GPU remains in the low power mode.

10. The system as recited in claim 8 wherein the controller is configured to determine that the GPU is to remain in the low power mode responsive to detecting that there are no tasks scheduled for the GPU to perform at the expiration of the designated period.

* * * * *